Feb. 1, 1949. P. D. WURZBURGER 2,460,667

FITTING

Filed Oct. 18, 1944

INVENTOR.
PAUL D. WURZBURGER.
BY

Patented Feb. 1, 1949

2,460,667

UNITED STATES PATENT OFFICE 2,460,667

FITTING

Paul D. Wurzburger, Cleveland Heights, Ohio

Application October 18, 1944, Serial No. 559,171

5 Claims. (Cl. 285—115)

This invention relates to the art of capillary joints and fittings and more particularly to improvements in the socket parts of capillary joints in which tubes or members are received telescopically and provide with the socket parts a capillary space into which a bonding material such as solder is introduced and distributed by capillary action.

Aspects of the problem to which my invention is addressed are discussed in my copending applications for Letters Patent of the United States, Serial Numbers 544,061 and 548,327 filed July 8, 1944 and August 7, 1944 respectively. The instant invention may be regarded at least in part as an improvement upon the inventions and disclosures of said applications. This application is a continuation in part of my said copending application Serial No. 544,061. Reference is also made to my copending application Serial No. 599,172 in which related subject matter is contained.

It is among the objects of my invention to improve the feeding, distribution and bonding of the bonding material such as solder to and within the capillary space between the socket and tube or member to be engaged therein.

Another object is to provide the socket part of a capillary fitting with means for guiding and heating a solder rod efficiently and inducing a rapid and proper flow of molten solder into the capillary space. Another object is to provide a feeding pocket or pocket-like aperture for the socket part of a fitting for receiving the solder or other bonding material, disposed in a position to be most useful and convenient both from the point of view of the mechanic making the joint and from the points of view of thermal and mechanical efficiency of the parts.

Another object is to bring heat to the solder feeding pocket in ample rate and amount to melt and transport the solder most efficiently into and throughout the joint.

Figure 1:
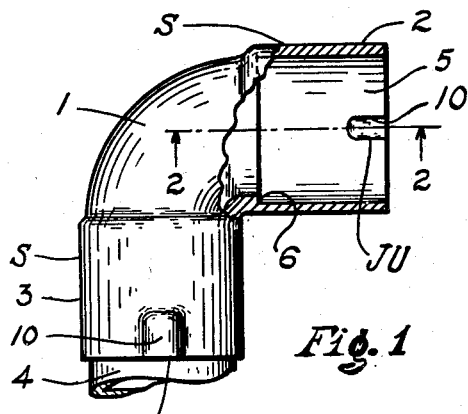
Figure 2:
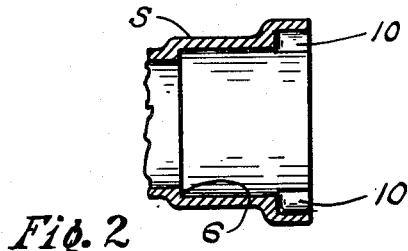
Figure 3:
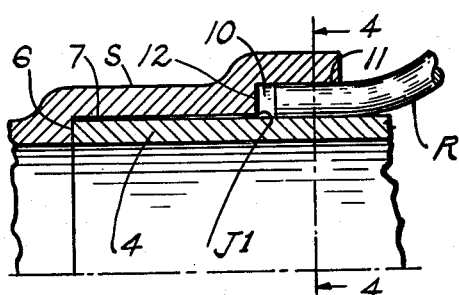
Figure 4:
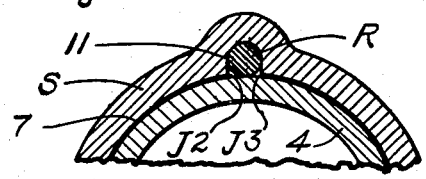
Figure 5:
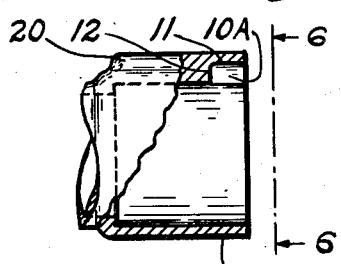
Figure 6:
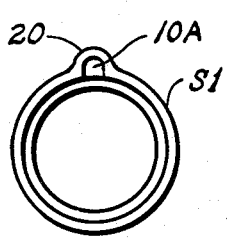
Figure 7:
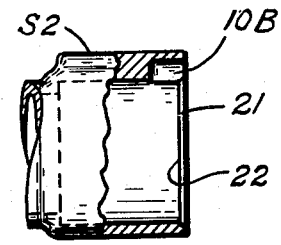
Figure 8:
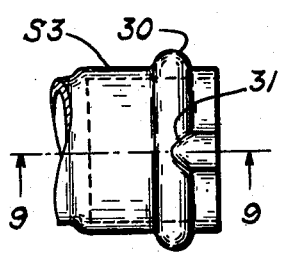
Figure 9:
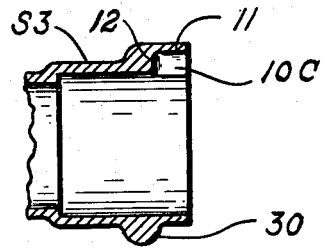

These and other objects will more fully appear from the following description of certain preferred and modified forms of my invention reference being had to the accompanying drawings in which Figure 1 is a partially broken elevation of an elbow fitting containing one form of my invention; Figure 2 is a longitudinal section taken along the line 2—2 of Figure 1; Figure 3 is an enlarged fragmentary section of parts of the tube and fitting of the form shown in Figures 1 and 2 along with a solder rod in a feeding position; Figure 4 is a transverse section taken along the line 4—4 of Figure 3; Figure 5 is a partially broken elevation of the socket part only of a fitting containing another form of my invention; Figure 6 is an end view taken along the line 6—6 of Figure 5; Figure 7 is a partially broken elevation of the socket part only of a fitting modified somewhat in respect to the form shown in Figures 5 and 6; Figure 8 is a side elevation of the socket part of a fitting containing another form of my invention, and Figure 9 is a longitudinal section along the line 9—9 of Figure 8.

For the sake of brevity I shall refer to solder as illustrative of various plastic bonding materials capable of being introduced into the capillary space of joints to which this invention pertains, and illustrative of various kinds of solders, brazing materials and other substances with which the art is familiar. Similarly, for the sake of brevity, I will not again refer to the adaptability of the socket parts of my invention to T's, crosses, straight unions, adapters, valve bodies and the like as well as to the elbow form specifically illustrated in the drawing, since these numerous dispositions and arrangements of socket parts in tube, pipe and other fittings are well-known. While reference will be made especially to the joining of hollow cylindrical parts such as tubes or pipes with the socket parts of pipe or tube fittings, it will be understood that the teachings and precepts of my invention have application to the joining of parts which are not necessarily hollow or tube-like or are not necessarily circular in transverse section.

In the drawings I have shown in Figure 1 a tube or pipe elbow 1 at the ends 2 and 3 of which are socket parts S into which may be inserted and joined the ends of tubular parts such as the hollow tube 4, shown entering the lower socket at 3. As is common practice in the art the sockets have smooth interior cylindrical surfaces 5 preferably terminating inwardly in a shoulder 6 against which the tube end may abut. The interior surface 5 of the socket and the juxtaposed exterior surface of the tube 4 form between them the capillary space shown in exaggeration at 7 in Figures 3 and 4 into which it is desired to introduce the solder in molten or fluid form by capillary attraction and distribution. Generally speaking the capillary space of the joint takes cylindrical form, terminates at the inward end of the joint adjacent the shoulder 6 and terminates at the outer end of the joint adjacent the outer end of the socket, i. e., wherever the intimate relation between the inner surface of the socket and the adjacent surface of the tube terminates. This outer edge J of the capillary space may be conveniently called the line of juncture between the capillary space and space exterior of the open end of the socket. In the practice of my invention I cause this line of juncture J, or the exposed outer edge of the capillary space, to extend longitudinally inwardly following a U-shaped contour as at JU, see Fig. 1, within a feeding pocket 10 formed adjacent the open end of the socket S. The pocket (or pockets) 10, see Figs. 1, 2 and 3, opens longitudinally outwardly at the open end of the socket, and when the tube 4 is in place, forms a chamber closed (except for the edge of the capillary space, by the outer surface of the tube on the inner side and by the inner surfaces 11 of the longitudinal walls and the radial surface 12 of the end wall of the pocket, Figs. 3 and 4. The pocket parts of the socket S preferably have the full wall thickness of the adjacent integrally formed walls of the socket and are so formed and proportioned as to receive freely but closely the end of a solder rod or wire R as shown in Figs. 3 and 4. Preferably the inner surfaces of the pocket may converge a little from the open to the closed end of the pocket to provide quite intimate contact with the solder rod particularly at the inner or bottom end of the pocket, and to facilitate insertion of the rod into the open end of the pocket.

In Figures 3 and 4 the solder rod R is shown to be partially inserted into the pocket 10 with the end of the rod approaching the end wall 12 of the pocket and with the sides of the rod contacting the tube 4 and the inner longitudinal surfaces of the pocket. If the parts in the relation shown in Figs. 3 and 4 are cold I prefer that the fit of the solder rod in the position shown in Fig. 3 be snug enough (especially if the rod be not truly round) to require a little manual effort to bring the end of the rod into substantial contact with the bottom 12 of the pocket. If the walls of the pocket, socket and tube are heated before the rod is inserted then the insertion of the rod will be accompanied by the melting of the inserted end thereof and the concurrent inhalation of the molten solder into the capillary space. As the solder rod R is introduced into and advanced within the pocket 10, when the parts are hot, a substantial length thereof is received within the pocket and heated both by contact with and radiation from the walls 11 and 12 of the pocket as well as the wall of the tube. The first increments of molten solder will tend to fill the parts of the pocket not directly filled by the rod and thus conduct heat to the adjacent parts of the cooler solid parts of the end of the rod. In this manner the end of the solder rod is subjected to rapid heating and the molten solder is delivered to the capillary space throughout the whole of the U-shaped line of juncture JU, see Figure 1, at the points J1, as viewed in Figure 3, and the points J2 and J3, as viewed in Figure 4.

I prefer that the line JU have the smoothly rounded inner corners substantially characteristic of the letter U to facilitate the melting of all the interior surfaces of the pocket adjacent the exposed edge of the capillary space. For the sake of illustration but not limitation the following table shows practicable embodiments of my invention in terms of the number of pockets per socket and the approximate relative sizes of the corresponding pockets and sockets; the depth of the pocket being measured from about the plane of the line J to the bottom wall 12 and the width the greatest circumferential distance between the sides 11 of the pocket; the size of the socket being expressed in terms of its depth to the inner shoulder 6, and its approximate actual internal diameter, following present "standard" practice:

| Socket | | Number of pockets/socket | Pocket | |
|---|---|---|---|---|
| diameter | depth | | depth | width |
| inches | inches | | inches | inches |
| 0.379 | 7/16 | 1 or 2 | 7/64 | 1/8 |
| 0.629 | 5/8 | 1 or 2 | 1/8 | 1/8 |
| 1.129 | 1 | 1 or 2 | 5/32 | 5/32 |
| 2.130 | 1 3/8 | 2 or 3 | 1/4 | 5/32 |
| 5.130 | 2 11/16 | 4 to 6 | 1 1/2 / 7/16 | 5/32 / 7/32 |

It will be appreciated that during the feeding operation, above described, the whole end and side walls of the rod R within the pocket 10 will be continuously heated and continuously melted so that manual pressure exerted on the rod may continuously advance additional elements of the rod to the pocket supplying fresh solder whilst the molten solder not only tends to fill the pocket but is also sucked into the capillary space to fill the capillary space. When it appears that the capillary space is full or substantially full of molten solder, the rod R should, of course, be withdrawn from the pocket and such molten solder therein as the capillary space cannot receive may be permitted to solidify within the pocket.

Those skilled in the art will understand the propriety of cleaning the surfaces that define the capillary space and pockets, the provision of proper flux and the action of the capillary force that will bring about the inhalation of the fluid solder from the pocket regardless of the position of the socket and pocket, whether the pocket opens upwardly, downwardly or sideways. In mentioning the insertion of the end of the solder rod into the pocket when the parts are cold, I contemplate that my invention may be usefully worked in that way as well as by inserting the solder into the pockets when the parts are hot. For example if the rod R, as shown in Fig. 3, be urged "home" in the pocket 10 and then cut off at about the mouth of the pocket while the assembled tube and socket are cold, and the parts thereafter heated, the mode of operation of my invention will be much the same as that above described. In many instances the added convenience of this procedure may be a distinctly added advantage. The size of the pocket or pockets so utilized must be taken into account in relation to the size of the capillary space, as will be discussed more fully below, is considering the number and spacing of pockets generally. I also contemplate that the pocket or pockets 10, 10A, etc., may be filled prior to assembly with the telescoping tube or member, preferably by casting a solder charge therein, which can be melted and caused to flow into the capillary space after the tube and socket are assembled as by heating the assembly. However the pocket or pockets are "pre-filled" with solder prior to the heating of the assembled parts, it is one of the advantages of my invention that additional solder can be fed into the open end of the pockets after all or part of the "pre-filled" charge has been drawn into the capillary space.

The socket S1 shown in Figures 5 and 6 contains the pocket 10A and may be interiorly the same as the socket S and pocket 10 of the preceding figures, but exteriorly the walls of the pocket merge into a longitudinal rib or thickened part 20 which extends preferably the whole length of the socket exteriorly thereof. The rib 20, as described and claimed in my earlier applications, serves as a heat reservoir to supply heat both for remelting solder in the pocket and in aiding the capillary flow and distribution thereof. Here in combination with the pocket 10A, heat from the rib flowing to the pocket speeds the melting of the solder in the pocket and provides additional heat to melt and distribute more solder per pocket or to melt and distribute solder in and from a or each pocket more rapidly. That is to say, for a joint of a given size in which the wall thickness of the socket is not substantially greater than that required for mechanical strength, the additional heat capacity of the rib being made available to the pocket in the end thereof may well avoid the necessity of feeding at two pockets, see Fig. 2, or may obviate the necessity of reheating the socket after an incomplete feeding through one socket. Forming the pocket directly within the rib or heat reservoir not only facilitates the flow of heat to the solder in the pocket but also delivers heat to the U-shaped edge of the capillary space along the line of juncture JU thereby aiding the "inhalation" of fluid solder into that space.

In Figure 7 all parts of the socket S2 are substantially the same as corresponding parts in Figures 5 and 6 except that the open end of the socket is chamfered at 21 whereby to set the outer exposed circular edge of the capillary space and circular line of juncture J rearwardly to the inner edge of the chamber along the line 22. Here the pocket 10B is preferably correspondingly deeper to preserve the extent of the U-shaped line of juncture within the pocket and the beneficence thereof.

The socket S3 shown in Figures 8 and 9 contains the pocket 10C of the instant invention in coacting relation with an annular rib 30 as distinguished from the longitudinal rib 20 of the preceding Figures 5 through 7, but may be interiorly the same as the other sockets. The outer walls of the pocket 10C, while extending longitudinally from the open end of the socket rearwardly, merge into the annular rib 30 as at 31 so that heat from the rib 30 may flow directly to the walls and inner surfaces of the pocket. In this form the mode of operation and advantages of the rib 30 in combination with the pocket 10C will be much the same as discussed in connection with the rib 20 in the combination with the pocket disclosed in Figures 5 and 6. In both instances the locus of the reservoir of heat in the rib is preferably located interiorly of the open end of the socket and of the closed end of the pocket whereby to tend to forcibly suck fluid solder out of the pocket into the capillary space.

The number of pockets provided in each socket whether incorporated with heat ribs or not may be selected and varied for a number of choices and reasons, of which a few are mentioned for illustration. First it is entirely practicable to provide more than one pocket per socket for the bare sake of convenience. In close quarters installation may be facilitated by providing enough pockets on all sides of the sockets so that at least one pocket is readily accessible regardless of the position of the fitting or part in which the socket is formed. Secondly the size of the socket may of itself suggest that solder be fed to the capillary space from a plurality of pockets either simultaneously or in sequence. Thirdly in practicing my invention by pre-filling the pocket or pockets with solder prior to heating the joint as mentioned above the relation of the volume of the pockets to the volume of the capillary space requires consideration unless supplemental or secondary feeding is contemplated. If supplemental additional feeding is not desired, I prefer to provide a plurality of small, i. e., normal size as above described, pockets in such cases rather than provide one large pocket having volume equal to the whole capillary space. That is to say, a socket having two small pockets, each of the size described with reference to Figures 1–4, the combined volume of which substantially equals the volume of the capillary space of the joint, is adaptable to either mode of use, whereas one large pocket of like volume, while serving the last purpose might be out of proportion, less convenient and not as readily adaptable to the first described mode of use as with standard size solder rods.

Fittings containing sockets with my invention may as in common practice in the art be cast of appropriate metal or wrought from light tubular stock. The pockets of the form shown in Figures 1–4 lend themselves to the wrought form especially by reason of the ease with which they may be embossed or formed in the socket walls when the latter are "sized" or formed out to size. There is nothing about the ribs or pockets of the instant invention inimical to casting the parts as in brass or bronze or other suitable material. The annular rib and pocket combination shown in Figures 8 and 9 lends itself to embodiment in the wrought form where the rib and the pocket walls may be conveniently "upset" in conjunction with the usual "sizing" of the socket.

While I have illustrated and described preferred forms and embodiments of my invention, modifications, changes and improvements therein will occur to those skilled in the art without departing from the precepts hereof, and I do not care to be limited in the scope of my patent to the forms herein specifically disclosed nor in any manner other than by the claims appended hereto.

I claim:

1. A joint comprising in combination a socket and an entering member telescoping with said socket, said socket and said entering member having therebetween a space of capillary magnitude to be filled by a bonding material by capillary attraction, said socket having at least one radially projecting feeding pocket of non-capillary magnitude adjacent the outer edge of said socket and extending longitudinally back from said outer edge less than the full length of said socket and forming an open-ended cavity for receiving bonding material.

2. The fitting according to claim 1 in which the wall of the socket longitudinally adjacent said pocket is thickened to form a rib externally coextensive with the external configuration of said pocket.

3. The fitting according to claim 1 in which the wall of the socket between said feeding pocket and the end of the socket remote from the said open end comprises a thickened portion of appreciably greater heat capacity than other portions of said wall remote from said pocket.

4. The fitting according to claim 1 in which the wall of said socket adjacent the closed end of said pocket is thickened to form an annular rib.

5. The fitting according to claim 1 in which the said pocket defines a reentrant U-shaped line of juncture in continuation of the line of juncture between the open end of the socket and the tube or member received therein.

PAUL D. WURZBURGER.

REFERENCES CITED

The following references are of record in the file of this patent:

UNITED STATES PATENTS

| Number | Name | Date |
|---|---|---|
| 1,901,820 | Parker | Mar. 14, 1933 |
| 1,947,581 | Cornelius | Feb. 20, 1934 |
| 1,963,421 | Robinson | June 19, 1934 |
| 2,050,728 | Ost | Aug. 11, 1936 |